Nov. 24, 1925.
F. MÜLLER
1,562,843
CHAIN AND PARTS THEREFOR
Filed Dec. 4, 1923
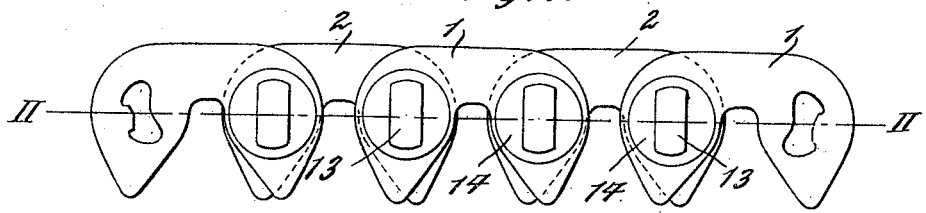
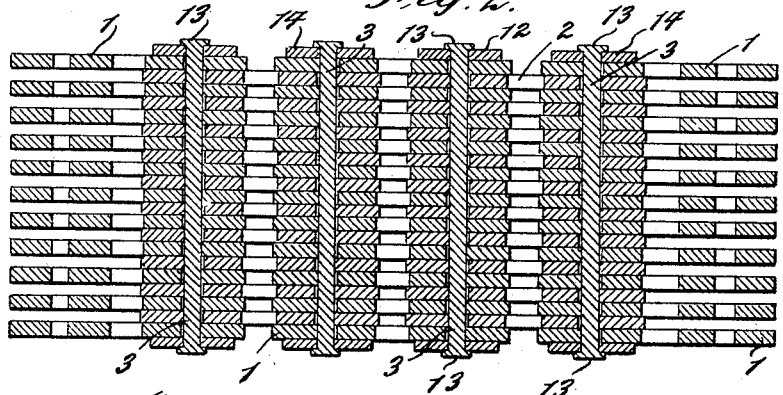
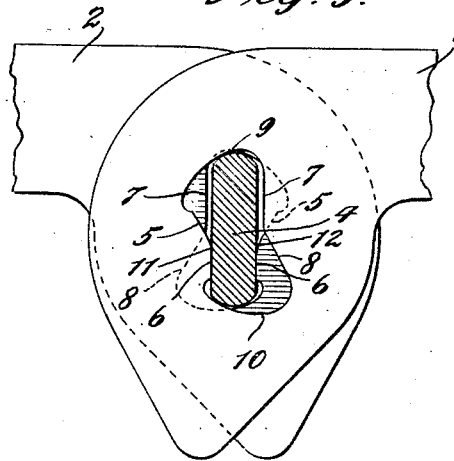
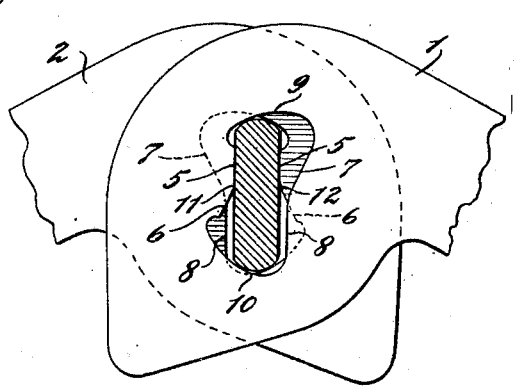
INVENTOR.
Friederich Müller
BY Gifford, Beall - Scull
his ATTORNEYS.

Patented Nov. 24, 1925.

1,562,843

UNITED STATES PATENT OFFICE.

FRIEDERICH MÜLLER, OF ELIZABETH, NEW JERSEY, ASSIGNOR TO THE WHITNEY MFG. CO., OF HARTFORD, CONNECTICUT, A CORPORATION OF CONNECTICUT.

CHAIN AND PARTS THEREFOR.

Application filed December 4, 1923. Serial No. 678,407.

*To all whom it may concern:*

Be it known that I, FRIEDERICH MÜLLER, a citizen of the United States, residing at Elizabeth, in the county of Union and State of New Jersey, have invented certain new and useful Improvements in Chains and Parts Therefor, of which the following is a specification.

My invention relates to chains of the silent type composed of a plurality of links fastened together by pins or pintles. Such chains, in order to meet the demands of commercial usage, must be substantially quiet in operation, inexpensive in manufacture and durable and efficient in use.

My invention relates to certain novel parts and combinations of parts for effecting the above ends, as will be particularly pointed out and claimed herein.

My invention will be better understood by reading the following description taken in connection with the accompanying drawings showing a preferred embodiment of my invention and in which Fig. 1 is a side view of a chain embodying my invention; Fig. 2 is an inverted sectional plan view taken along the plane of the line II—II of Fig. 1; Fig. 3 is a sectional elevation on a scale larger than the preceding figures and showing the positions assumed by links relative to the pin passing through the openings therein on a straight run of the chain, and Fig. 4 is a view similar to Fig. 3, illustrating the joint when flexed, as around a sprocket.

Like reference characters indicate like parts throughout the drawings.

As will be seen from Figs. 1 and 2, the chain consists of a plurality of links 1, arranged alongside of each other and joined to a similar series of similar links 2 by pins 3. Each of the links 1 and 2 is provided at each end with an opening which widens from the pivotal center 4 of the joint. The openings in the two ends of each link are similar so that in assembling the links into a chain, the ends may be interchanged. The sides 5, 6, 7 and 8 of the openings are along substantially straight lines. The ends 9 and 10 of the openings are irregular in form, so that when the links move from the position shown in Fig. 3 to that shown in Fig. 4, the rolling of the parts 11 and 12 will cause the pin to move edgewise downwardly and the eccentricity of the ends is such as to aid this movement. This will decrease the friction at the joints and thus increase the efficiency of the chain. It will be noted that the sides 7 and 8 of the openings are longer than the sides 5 and 6.

When the links are assembled, as shown in Figs. 1 and 2, the pins 3 are placed through the registering openings and the ends of the pins riveted, as at 13. Usually washers 14 are placed around the ends of the pins before they are riveted over, but they may be omitted, if desired.

Aside from the openings and pins used in the links shown, the links are of the general construction heretofore largely used in chains of this type.

Referring particularly to Figs. 3 and 4, which show the joint of the chain on an enlarged scale, it will be noted that whereas the openings are at a slight angle to the vertical, the pin 3 assumes a substantially vertical position. The pin shown in the drawings has parallel sides and rounded edges and may be made inexpensively by rolling down a round rod of the correct size to the form shown. When the links 1 and 2 are assembled, the openings in the links of adjacent pitches extend at the same angle to the vertical but on opposite sides thereof, so that in a straight run of the chain, as shown in Fig. 3, the side 6 of the link 1 engages the pin 3 and the corresponding side 6 of the link 2 engages the opposite side of the pin, so that the pin is held between the sides 6 of the links during the straight run of the chain.

During the time that the chain is passing around the sprocket, the pin is held between the sides 5 of the links 1 and 2; that is to say, during the time the chain is passing around the sprocket, the forces exerted by the links of adjacent pitches are in opposite directions and are active through the upper portion of the pin, whereas in the straight run of the chain, these forces act in opposite directions through the lower portion of the pin.

During the transition period from straight run to flexed position of the joint, there is a rolling action between links of adjacent pitches and the pin. This rolling action takes place near the pivotal center and is between the surfaces 11 of the links 1 and the corresponding surfaces 12 of the links 2 and the pins 3. During the period mentioned, the pin 3 moves edgewise as the two surfaces 11 and 12 roll upon the sides of the pin to the position shown in Fig. 4. During this movement and by reason of the eccentric character of the openings through the links, the composite opening or the space occupied by the pin lengthens below the pivotal center so as to permit the pin to move edgewise to the position shown in Fig. 4. At the same time, the space occupied by the upper part of the pin shortens, so that the pin at all times substantially fills the clear space or composite opening in the links of the adjacent pitches. By the clear space or composite opening is meant the opening made up of that part of the individual openings which is common to the openings in all the links in all positions between the extremes shown in Fig. 3 and Fig. 4. It will be understood, however, that in all positions of the links there is sufficient clearance between the edges of the pin and the links at the ends of the openings to permit free movement of the links around the pin without binding.

By the provision of pins and openings as above described, a different set of surfaces is provided for the links during the straight run of the chain. This provides a maximum surface area during the straight run of the chain, thereby providing a more efficient chain and one wherein the lengthening of the chain due to wear is eliminated; also the rolling action between the pins and links practically eliminates wear during the flexing of the joints and the chain has very little noise. In the drawings the eccentricity of the ends of the openings is exaggerated for the purpose of clearer illustration.

In the construction above described, it will be noted that the pivotal centers are within the areas of the pivotal pins.

While I have shown and described in detail one embodiment of my invention, I desire it to be understood that I am not limited to the exact arrangement shown, as changes may be made in the details without departing from the spirit of my invention.

I claim:

1. In a chain, a series of links, each having an opening widening in two directions from the pivotal center, the sides extending along straight lines substantially throughout their length and the ends being eccentric.

2. In a chain, a series of links, each having an opening widening from the pivotal center, said openings being longer along one side than the other, the sides being straight substantially throughout their length and their ends eccentric.

3. In a chain, a series of links, each having an opening widening from the pivotal center, said openings being longer along one side than the other, pins in said openings, the openings in overlapping links being reversely arranged, whereby said pins may move edgewise during the flexing of the joints.

4. In a chain, a series of links, each having an opening widening from the pivotal center, said openings being longer along one side than the other, pins having parallel opposite sides in said openings, the openings in overlapping links being reversely arranged, whereby said pins may move edgewise during the flexing of the joints.

5. In a chain, a plurality of articulated links, each having an elongated opening in each end, said opening extending along a center line at an angle to the longitudinal axis of the link, said openings being similar but reversely arranged in the opposite ends of each link and in the overlapping links of the chain and one side of each of said openings being longer than the other, whereby the composite opening through a series of links increases in length on one side of the longitudinal axis of the link when the joint is flexed.

FRIEDERICH MÜLLER.